United States Patent
Jung et al.

(10) Patent No.: US 12,192,926 B2
(45) Date of Patent: Jan. 7, 2025

(54) METHOD AND APPARATUS FOR REFERENCE SIGNALS IN A MEASUREMENT WINDOW

(71) Applicant: Lenovo (Singapore) Pte. Ltd., New Tech Park (SG)

(72) Inventors: Hyejung Jung, Northbrook, IL (US); Alexander Johann Maria Golitschek Edler von Elbwart, Wiesbaden (DE); Joachim Löhr, Wiesbaden (DE); Vijay Nangia, Woodridge, IL (US); Prateek Basu Mallick, Dreieich (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 251 days.

(21) Appl. No.: 17/632,224

(22) PCT Filed: Aug. 17, 2020

(86) PCT No.: PCT/IB2020/057746
§ 371 (c)(1),
(2) Date: Feb. 1, 2022

(87) PCT Pub. No.: WO2021/028894
PCT Pub. Date: Feb. 18, 2021

(65) Prior Publication Data
US 2022/0286984 A1  Sep. 8, 2022

Related U.S. Application Data

(60) Provisional application No. 62/887,624, filed on Aug. 15, 2019.

(51) Int. Cl.
*H04W 56/00* (2009.01)
*H04L 5/00* (2006.01)
(Continued)

(52) U.S. Cl.
CPC .......... *H04W 56/001* (2013.01); *H04L 5/0048* (2013.01); *H04W 24/10* (2013.01); *H04W 4/20* (2013.01)

(58) Field of Classification Search
CPC ............... H04W 56/00; H04W 56/001; H04W 56/0015; H04W 24/00; H04W 24/10;
(Continued)

(56) References Cited

U.S. PATENT DOCUMENTS

2018/0199308 A1* 7/2018 Liu ................... H04W 68/02
2019/0274094 A1* 9/2019 Lu ..................... H04W 52/0206
(Continued)

FOREIGN PATENT DOCUMENTS

WO     2018091107 A1    5/2018
WO     WO-2020192763 A1 * 10/2020 ........... H04L 5/0051

OTHER PUBLICATIONS

LG Electronics, "Initial access and mobility for NR unlicensed operation", 3GPP TSG RAN WG1 Meeting #93, R1-1806646, Busan, Korea, May 2018, 5 pages.
(Continued)

*Primary Examiner* — Warner Wong
(74) *Attorney, Agent, or Firm* — FIG. 1 Patents (57) ABSTRACT

Information of at least one measurement RS resource and measurement timing configuration can be received (510). An attempt can be made to detect (530) at least one measurement RS on the at least one measurement RS resource from downlink signals received (520) in a first measurement window. Measurements can be performed (540) on a first set of measurement RSs including at least one successfully detected measurement RS from the at least one measurement RS. A second set of measurement RSs can be identified (550) from the at least one measurement RS, where the second set of measurement RSs was not detected in the first
(Continued)

measurement window. An attempt can be made to detect (560) at least the second set of measurement RSs in a second measurement window, where the second measurement window can start no earlier than an end of the first measurement window.

20 Claims, 6 Drawing Sheets

(51) Int. Cl.
*H04W 24/10* (2009.01)
*H04W 4/20* (2018.01)

(58) Field of Classification Search
CPC ........ H04W 4/20; H04L 5/003; H04L 5/0048; H04L 5/005; H04L 5/0053; H04L 12/1868; H04L 47/822; H04L 2025/03783; H04L 2025/03796; H04L 27/261; H04L 27/2613
See application file for complete search history.

(56) References Cited

U.S. PATENT DOCUMENTS

| | | | |
|---|---|---|---|
| 2020/0146063 A1* | 5/2020 | Xu | H04W 24/08 |
| 2020/0351126 A1* | 11/2020 | Siomina | H04W 76/25 |
| 2020/0359243 A1* | 11/2020 | Zhou | H04W 72/23 |
| 2021/0050968 A1* | 2/2021 | Yi | H04L 5/0048 |
| 2021/0282079 A1* | 9/2021 | Wu | H04L 5/005 |
| 2021/0288728 A1* | 9/2021 | Nam | H04W 24/02 |
| 2021/0315012 A1* | 10/2021 | Yoon | H04W 74/008 |
| 2021/0344433 A1* | 11/2021 | Li | H04L 5/0023 |
| 2022/0007217 A1* | 1/2022 | Mondal | H04W 76/18 |
| 2022/0053347 A1* | 2/2022 | Pezeshki | H04W 24/04 |
| 2022/0053590 A1* | 2/2022 | Ma | H04W 76/19 |
| 2022/0061116 A1* | 2/2022 | Lim | H04W 24/08 |
| 2022/0191754 A1* | 6/2022 | Yao | H04W 36/0058 |
| 2022/0286984 A1* | 9/2022 | Jung | H04W 56/001 |

OTHER PUBLICATIONS

OPPO , "Initial access and mobility for NR-U", 3GPP TSG RAN WG1 Meeting #94bis, R1-1810959, Chengdu, China, Oct. 2018, 4 pages.

PCT/IB2020/057746 , "International Search Report and Written Opinion", PCT Application No. PCT/IB2020/057746, Feb. 18, 2021, 11 pages.

ZTE , et al., "Discussion on enhancement of initial access procedures for NR-U", 3GPP TSG RAN WG1 Meeting #97, R1-1905952, Reno, USA, May 2019, 15 pages.

* cited by examiner

METHOD AND APPARATUS FOR REFERENCE SIGNALS IN A MEASUREMENT WINDOW

BACKGROUND

1. Field

The present disclosure is directed to a method and apparatus for reference signals in a measurement window.

2. Introduction

Presently, wireless communication devices, such as User Equipment (UE), communicate with other communication devices using wireless signals. Third Generation Partnership Project (3GPP) New Radio (NR)-based access to unlicensed spectrum, for example, 5 GHz, 6 GHz, 37 GHz, and 60 GHz, with wider bandwidth (e.g. 80 or 100 MHz), can provide additional radio resources necessary to achieve multi-Gbps data rates. Considered NR deployment scenarios in unlicensed spectrum include NR-Licensed Assisted Access (LAA) anchored to a legacy Long Term Evolution (LTE) carrier by Dual-Connectivity (DC) or anchored to a NR carrier by Carrier Aggregation (CA) and a stand-alone operation of NR in unlicensed spectrum.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for reference signals in a measurement window.

At least some embodiments can provide radio link monitoring in unlicensed spectrum. At least some embodiments can provide methods to handle missing Radio Link Monitoring-Reference Signal (RLM-RS) due to Listen-Before-Talk (LBT)/Contention based Channel Access (CCA) failure for efficient radio link monitoring in unlicensed spectrum. One or more auxiliary RLM measurement windows can be used in order to compensate incomplete or no RLM-RS (for example, Synchronization Signal/Physical Broadcast Channel block (SSB) and/or Channel State Information-Reference Signal (CSI-RS)) transmissions that occurs in a periodically occurring RLM measurement window. Various methods of RLM-RS transmission can be used for a network entity, taking into account resource utilization efficiency in a cell and better coexistence with other systems in unlicensed spectrum. Various methods of RLM-RS measurements can be used for a user equipment, taking into account impact on UE power consumption. At least some embodiments can provide methods to perform radio link quality assessment for an undetected SSB, which can reduce unnecessary RLF declaration due to missing RLM-RS.

According to a possible embodiment, information of at least one measurement RS resource and measurement timing configuration can be received. Downlink signals can be received in a first measurement window. An attempt can be made to detect at least one measurement RS on the at least one measurement RS resource from the received downlink signals in the first measurement window. Measurements can be performed on a first set of measurement RSs from the at least one measurement RS, where the first set of measurement RSs can include at least one successfully detected measurement RS from the at least one measurement RS. A second set of measurement RSs can be identified from the at least one measurement RS, where the second set of measurement RSs was not detected in the first measurement window. An attempt can be made to detect at least the second set of measurement RSs in a second measurement window, where the second measurement window can start no earlier than an end of the first measurement window.

According to another possible embodiment, information of at least one measurement RS resource and measurement timing configuration can be transmitted. An attempt can be made to transmit at least one measurement RS on the at least one measurement RS resource in a first measurement window. A set of measurement RSs can be identified from the at least one measurement RS, where the set of measurement RSs was not transmitted in the first measurement window. An attempt can be made to transmit at least the set of measurement RSs in a second measurement window, where the second measurement window can start no earlier than an end of the first measurement window.

Figure 1:
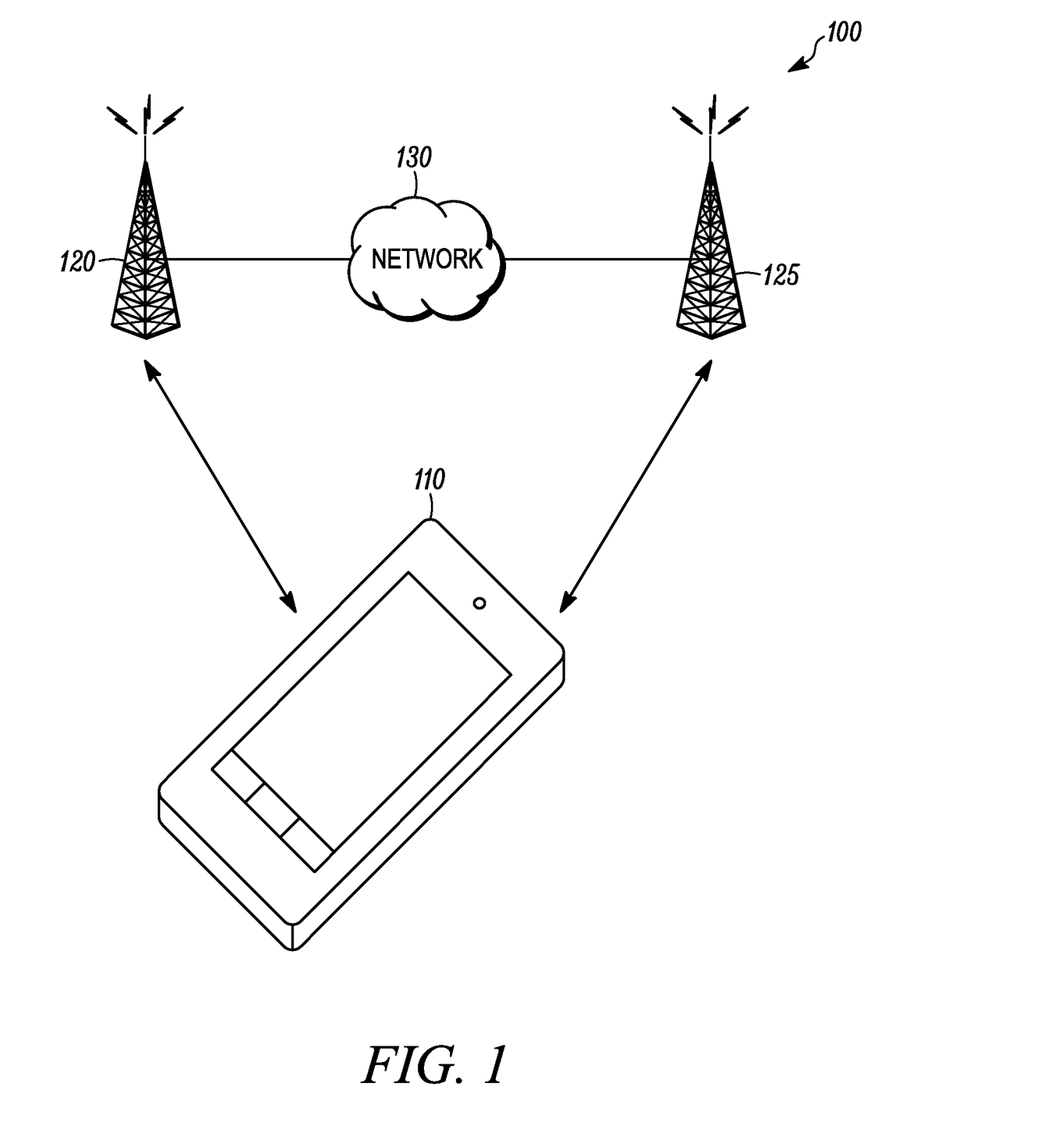
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an Internet of Things (IoT) device, or any other user device that is capable of sending and receiving communication signals on a wireless network. The at least one network entity 120 and 125 can be a wireless wide area network base station, can be a NodeB, can be an enhanced NodeB (eNB), can be a New Radio (NR) NodeB (gNB), such as a Fifth Generation (5G) NodeB, can be an unlicensed network base station, can be an access point, can be a base station controller, can be a network controller, can be a Transmission and Reception Point (TRP), can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3rd Generation Partnership Project (3GPP)-based network, a 5G network, a satellite communications network, a high altitude platform network, the Internet, and/or other communications networks.

In operation, the UE 110 can communicate with the network 130 via at least one network entity 120. For example, the UE 110 can send and receive control signals on a control channel and user data signals on a data channel.

Unlicensed technologies can comply with certain regulations, e.g. Listen-Before-Talk (LBT) for fair coexistence between cellular operations and other technologies such as Wi-Fi, as well as between cellular operators themselves and for minimizing interference to other users. These regulations and restrictions on channel access and usage may require some changes in NR physical layer channels/signals and/or higher layer procedures. On the other hand, it can be useful to re-use NR Layer 1/2 designs for licensed spectrum as much as possible for unlicensed spectrum, in order to minimize additional implementation complexity.

If a cell deployed in unlicensed spectrum is a primary cell for a UE or is configured as a primary secondary cell for the UE, the UE can perform (or may perform for Primary Secondary Cell Group (SCG) Secondary Cell (PSCell)) Radio Link Monitoring (RLM) by assessing the downlink radio link quality of the cell periodically. In unlicensed spectrum, a network entity may often not be able to transmit reference signals that are used by the UE for RLM due to LBT and/or contention-based channel access procedures, and this can lead to unnecessary triggering of Radio Link Failure (RLF) related procedures at the UE.

At least some embodiments can provide methods to handle missing RLM-Reference Signal (RS) due to LBT failure and allow efficient radio link monitoring in unlicensed spectrum in terms of resource efficiency, better coexistence with other systems, and reduction of unnecessary RLF declaration.

In 3GPP Rel-15 NR, a UE in a cell deployed in licensed spectrum can be configured with single antenna port Channel State Information (CSI)-RS and/or Synchronization Signal (SS)/Physical Broadcast Channel (PBCH) block(s) for RLM-RS, and resources for interference and noise measurement for RLM can be left up to UE implementation. Depending on operating frequency bands, the UE can be configured with up to 2 (up to 3 GHz frequency band), 4 (between 3 GHz and 6 GHz frequency bands), or 8 (above 6 GHz frequency bands) RLM-RS resources per Bandwidth Part (BWP) in a cell where the UE performs RLM (e.g. Primary Cell (PCell), PSCell, SpCell referring to a PCell and a PSCell).

Based on 3GPP Technical Specification (TS) 38.213, if the UE is not provided RadioLinkMonitoringRS and the UE is provided for Physical Downlink Control Channel (PDCCH) receptions Transmission Configuration Indicator (TCI) states that include one or more of a CSI-RS, then the UE can use for radio link monitoring the RS provided for the active TCI state for PDCCH reception if the active TCI state for PDCCH reception includes only one RS. Also, if the active TCI state for PDCCH reception includes two RS, the UE can expect that one RS has Quasi Co-Location (QCL)-TypeD and the UE can use the RS with QCL-TypeD for radio link monitoring; the UE may not expect both RS to have QCL-TypeD. Additionally, the UE may not be required to use for radio link monitoring an aperiodic or semi-persistent RS. Furthermore, for $L_{max}=4$, the UE can select the $N_{RLM}$ RS provided for active TCI states for PDCCH receptions in CORESETs associated with the search space sets in an order from the shortest monitoring periodicity. If more than one CORESET is associated with search space sets having same monitoring periodicity, the UE can determine the order of the CORESET from the highest CORESET index as described in Subclause 10.1.

A UE may not expect to use more than $N_{RLM}$ (2, 4, or 8 for the maximum allowed Synchronization Signal Blocks (SSBs) of 4, 8, 64, respectively) RS for radio link monitoring when the UE is not provided RadioLinkMonitoringRS.

Based on 3GPP TS38.213, the physical layer in the UE can assess once per indication period the radio link quality, evaluated over the previous time period defined in [TS 38.133] against thresholds ($Q_{out}$ and $Q_{in}$). The UE can determine the indication period as the maximum between the shortest periodicity for radio link monitoring resources and 10 msec. In Discontinuous Reception (DRX) mode operation, the indication period can be determined as the maximum between the shortest periodicity for radio link monitoring resources and the DRX period. The physical layer in the UE can, in frames where the radio link quality is assessed, indicate out-of-sync to higher layers when the radio link quality is worse than the threshold $Q_{out}$ for all resources in an RLM resource set. When the radio link quality is better than the threshold $Q_{in}$ for any resource in the set of resources for radio link monitoring, the physical layer in the UE can, in frames where the radio link quality is assessed, indicate in-sync to higher layers.

For a cell deployed in unlicensed spectrum, a UE can use a discovery reference signal including at least one or more SS/PBCH blocks in order to perform cell detection and Radio Resource Management (RRM) measurements. The UE can assume that the DRS is transmitted within a configured or predefined DRS transmission window but may not consider DRS transmission outside of the DRS transmission window. In one example, the maximum DRS transmission window duration can be set to 5 ms (e.g. a duration of a half-frame), and the maximum number of candidate SSB positions within a DRS transmission window can be set to 10 for SSBs with 15 kHz Subcarrier Spacing (SCS) and 20 for SSBs with 30 kHz SCS. A starting point for DRS transmissions within the DRS transmission window can be any candidate SSB position. Moreover, if the UE is configured with one or more SSBs for RLM-RS, the UE can assume an RLM measurement window to be the same as a DRS transmission window for SSB-based RLM. This can imply that the SSB-based RLM-RS cannot fall outside the RLM measurement window.

For RLM in unlicensed spectrum, a third indicator type can be defined for radio link quality, e.g. 'Failed To Detect (FTD)' indication, to higher layers in addition to In-Service (IS) and Out-of-Service (OOS) indication. However, from UE's perspective, the reason for failure to detect RLM-RS may not be clear, since detection failure could be caused by channel blocking and/or strong interference from a hidden node in unlicensed spectrum and/or from missed RLM-RS transmission from a network entity (e.g. gNB) due to LBT and CCA. If the detection failure occurs due to the former reason (i.e. blocking and/or interference), the UE can report an OOS indication to the higher layers. Therefore, it may be difficult to define an appropriate RLM and RLF procedure based on an FTD metric, if the FTD metric is solely used by the UE.

Also, for RLM in unlicensed spectrum, a UE can declare RLF if UL LBT and CCA fails persistently. However, the RLF related actions (e.g. RRC connection re-establishment for PCell or reporting SCG failure for PSCell) can be mainly for the UE that is not reachable by a network entity in a corresponding RLM cell due to poor radio conditions and/or due to DL LBT and CCA failure. Considering that the persistent UL LBT and CCA failure can be implicitly detected by the network entity from persistently missed UL transmissions from the UE, for the UE to follow a command from the network entity (e.g. change of PCell or PSCell or release of SCG) can be more efficient than UE's self-recovery based on RLF declaration.

According to TS 38.214 V15.4.0, a UE can be higher-layer configured with a list of up to M TCI-State configurations to decode PDSCH intended for the UE in a serving cell, where M can depend on the UE capability. Each TCI-State can contain parameters for configuring a quasi-co-location relationship between one or two downlink reference signals and the DM-RS ports of the PDSCH. The quasi co-location relationship can be configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to each DL RS can be given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

In the description of various embodiments and implementations, the terms 'DRS transmission window' and 'RLM measurement window' can be used interchangeably. In addition, some or all of RLM-RS transmission methods and RLM-RS measurement methods disclosed herein can also be applicable to CSI-RS based RLM measurements. Further, some or all of RLM-RS transmission methods and RLM-RS measurement methods disclosed herein are also applicable to RRM-RS transmissions and measurements.

At least some embodiments can provide RLM measurements with an auxiliary RLM measurement window. In one possible embodiment, a UE can receive information of one or more RLM-RS resources and/or an RLM measurement timing configuration. If the UE is configured with at least one SSB for RLM-RS and if the UE does not detect all of the at least one SSB configured as RLM-RS in a first RLM measurement window (or equivalently, a first DRS transmission window), the UE can attempt to perform SSB-based RLM measurements in an auxiliary RLM measurement window (or an auxiliary DRS transmission window), where the auxiliary RLM measurement window can be located in a time interval between an end of the first RLM measurement window and a start of a second RLM measurement window (or a second DRS transmission window), where the first and second RLM measurement windows can be periodically occurring two consecutive RLM measurement windows. Information of the RLM measurement timing configuration for SSB-based RLM measurements can include configuration information of periodically occurring RLM measurement windows and configuration information of one or more auxiliary RLM measurement windows that can occur between periodically occurring two consecutive RLM measurement windows (or DRS transmission windows). In one example, configuration information of periodically occurring RLM measurement windows can include a periodicity, a slot and/or subframe offset value, and/or a duration. In another example, configuration information of the one or more auxiliary RLM measurement windows can include a maximum number of auxiliary RLM measurement windows within a period of periodically occurring RLM measurement windows, one or more slot and/or subframe offset values, and/or one or more durations corresponding to the one or more auxiliary RLM measurement windows.

In one example, a UE can setup RLM Measurement Timing Configuration (RMTC) in accordance with the received periodicityAndOffset parameter (providing Periodicity and Offset value for the following condition) in the rmtc configuration. The first subframe of each RMTC occasion can occur at a System Frame Number (SFN) and subframe of the NR SpCell meeting the following condition:

SFN mod T = (FLOOR (Offset/10));
if the Periodicity is larger than sf5:
   subframe = Offset mod 10;
else:
   subframe = Offset or (Offset +5);
with T = CEIL(Periodicity/10).

Figure 2:
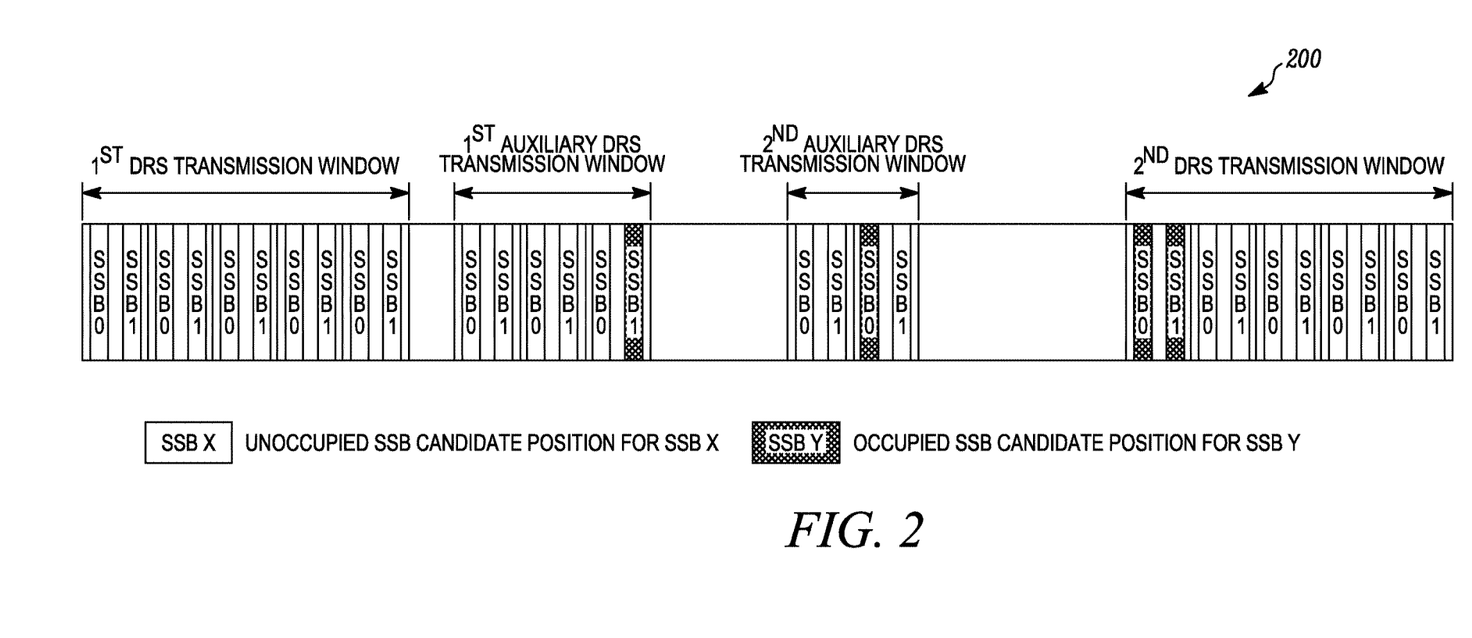
FIGS. 2-4 are example illustrations of Discovery Reference Signal (DRS) transmissions with one or more auxiliary DRS transmission windows according to different possible embodiments.
Figure 3:
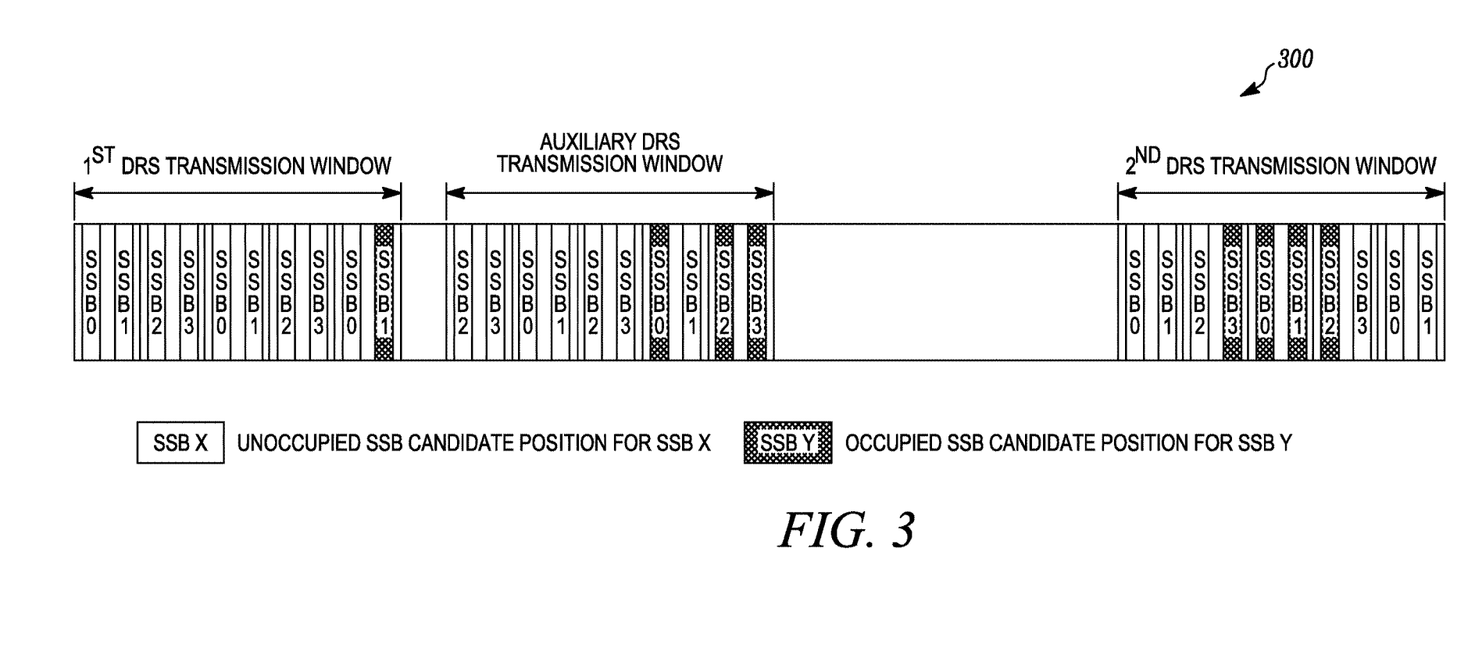
Figure 4:
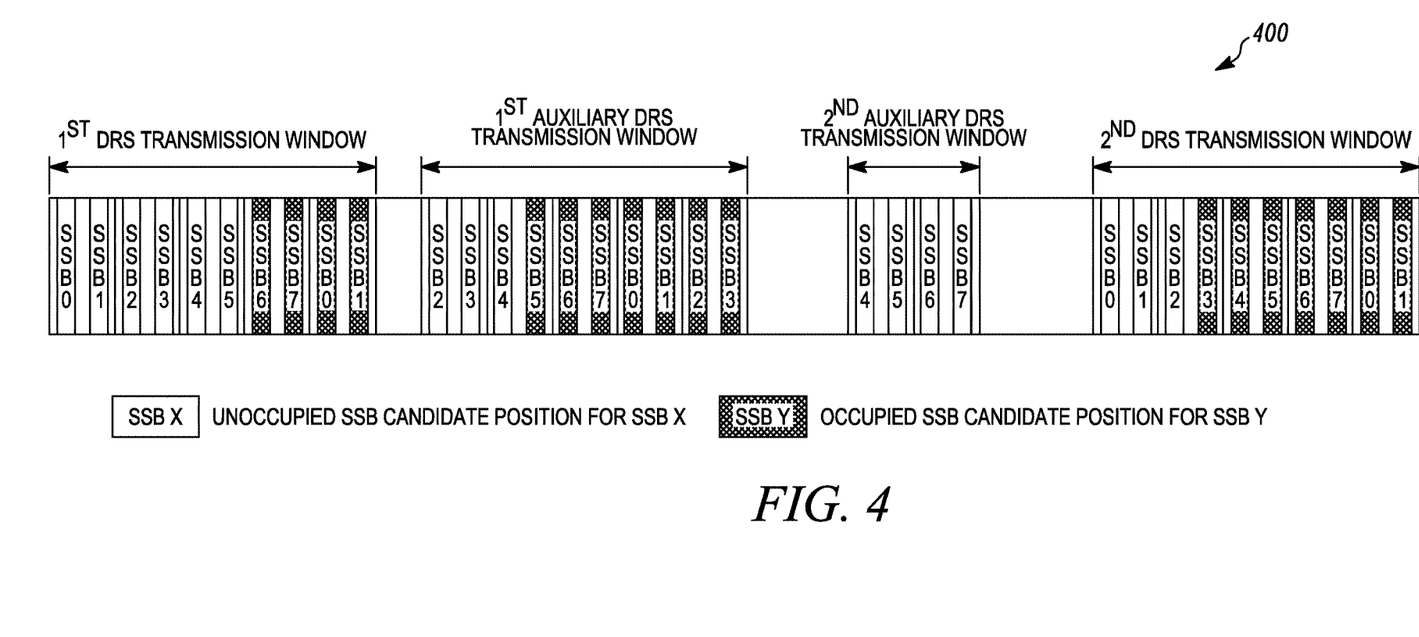

FIGS. 2-4 are example illustrations 200, 300, and 400 of DRS transmissions with one or more auxiliary DRS transmission windows according to different possible embodiments. The illustration 200 shows an example of a maximum number of SSBs being configured to two according to a possible embodiment. The illustration 300 shows an example of the maximum number of SSBs being configured to four according to a possible embodiment. The illustration 400 shows an example of the maximum number of SSBs being configured to eight according to a possible embodiment.

At least some embodiments can provide implementations for a network entity, such as a base station, eNB, gNB, or other network entity.

In one implementation, a network entity can transmit one or more SSBs in an auxiliary DRS transmission window only if it was not able to complete transmission of all the intended SSBs in the first DRS transmission window. Further, the network entity can transmit, in the auxiliary DRS transmission window following the first DRS transmission window, only SSBs that were not transmitted in the first DRS transmission window as shown in the illustration 300. This can guarantee maintaining the same DRS overhead in a cell even with the auxiliary DRS transmission window. If more than one auxiliary DRS transmission window is configured and if the network entity has not been able to complete transmission of all the intended SSBs in up to a current auxiliary DRS transmission window including the first DRS transmission window, the network entity can continue attempting to transmit the remaining SSBs in a next configured auxiliary DRS transmission window, as shown in the illustration 200. In the illustration 400, the network entity can transmit SSB6, SSB7, SSB0, SSB1 in the first auxiliary DRS transmission window that were transmitted in the first DRS transmission window. This can be for the network entity to maintain a channel access until the end of the first auxiliary DRS transmission window.

In another implementation, a configured or predefined SSB transmission order (or a subset of SSB candidate positions for a given SSB) in an auxiliary DRS transmission window can be different from an order in a periodically occurring DRS transmission window, while all periodically occurring DRS transmission windows can have the same predefined or configured SSB transmission order. Furthermore, if more than one auxiliary DRS transmission window are configured, an SSB transmission order of each configured auxiliary DRS transmission window can be different. The SSB transmission orders of the configured auxiliary DRS transmission windows can be defined or configured such that similar or equal transmission opportunities are provided for all SSBs within an RMTC period. For example, as shown in the illustration 300 for the case of the maximum 4 SSBs being transmitted, if the first DRS transmission window ends with a position of SSB1, a first configured auxiliary DRS transmission window following the first DRS transmission window can start with a position of SSB 2 and end with a position of SSB3. The SSB transmission order (or a subset of SSB candidate positions for a given SSB) can be dependent on a number of SSB candidate positions per DRS transmission window and a maximum allowed number of SSBs being transmitted per DRS transmission window.

In other implementations, the SSB transmission order can be set to be the same for all periodically occurring DRS transmission windows and the one or more configured auxiliary DRS transmission windows.

In other implementations, durations of the one or more configured auxiliary DRS transmission windows can be set to be the same as the duration of periodically occurring DRS transmission windows. Alternatively, the durations of the one or more configured auxiliary DRS transmission windows can be set to decrease from one window to a following window, in order to guarantee better coexistence with other systems in unlicensed spectrum.

At least some embodiments can provide implementations for a UE. In one implementation, if more than one auxiliary DRS transmission window is configured and if the UE has not been able to detect all of the at least one SSB configured as RLM-RS in up to a current auxiliary DRS transmission window including the first DRS transmission window, the UE can continue attempting to perform SSB-based RLM measurements in a next configured auxiliary DRS transmission window. Within a given RLM measurement period (or an indication period), once the UE completes detecting all of the at least one SSB configured as RLM-RS or completes attempting to perform SSB-based RLM measurements in up to a last configured auxiliary DRS transmission window, the UE can determine whether to generate an IS or OOS indication based on all the obtained SSB-based RLM measurements including any undetected SSB of the at least one SSB configured as RLM-RS.

In another implementation, if the UE detects neither any of the at least one SSB configured as RLM-RS nor other SSBs not configured as RLM-RS in the first DRS transmission window, the UE can attempt to perform SSB-based RLM measurements in a following auxiliary RLM measurement window. If the UE does not detect all of the at least one SSB configured as RLM-RS but detects at least one SSB in the first DRS transmission window and successfully decodes PBCH from the detected at least one SSB, the UE can identify whether all of the at least one SSB configured as RLM-RS are transmitted from the decoded PBCH. Assuming that a PBCH including PBCH DMRS includes information of an SSB candidate position index for a corresponding SSB and information of a starting SSB in DRS transmission, the UE can identify one or more transmitted SSBs and occupied SSB candidate positions in the first DRS transmission window. In response to determining that not all of the at least one SSB configured as RLM-RS are transmitted, the UE can attempt to perform SSB-based RLM measurements in a following auxiliary RLM measurement window. In response to determining that all of the at least one SSB configured as RLM-RS are transmitted, the UE may not perform SSB-based RLM measurements in the following auxiliary RLM measurement window, but can determine whether to generate an IS or OOS indication at least based on SSB-based RLM measurements including any undetected SSB of the at least one SSB configured as RLM-RS from the first DRS transmission window. In general, if the UE determines that not all of the at least one SSB configured as RLM-RS have been transmitted up to a current auxiliary DRS transmission window including the first DRS transmission window, the UE can continue attempting to perform SSB-based RLM measurements in a next configured auxiliary RLM measurement window. Within a given RLM measurement period (or an indication period), once the UE determines that all of the at least one SSB configured as RLM-RS have been transmitted or completes attempting to perform SSB-based RLM measurements in up to a last configured auxiliary DRS transmission window, the UE can determine whether to generate an IS or OOS indication based on all the obtained SSB-based RLM measurements including any undetected SSB of the at least one SSB configured as RLM-RS.

In another embodiment regarding radio link quality assessment of an undetected SSB, in one implementation, a UE can consider that a radio link quality of an undetected SSB of at least one SSB configured as RLM-RS is worse than the threshold $Q_{out}$, irrespective of whether the undetected SSB has been transmitted or not in a given RLM measurement period. Thus, if the UE does not detect any SSB within the RLM measurement period, the UE can indicate OOS to the higher layer.

In another implementation, a UE can consider that a radio link quality of an undetected SSB of at least one SSB configured as RLM-RS is worse than the threshold $Q_{out}$, only if the UE determines that the undetected SSB has been transmitted (e.g. based on information obtained from decoding of PBCH). If the UE is not able to determine whether the undetected SSB has been transmitted or not, or if the UE determines that the undetected SSB has not been transmitted, the UE can consider that the radio link quality of the undetected SSB is neither better than the threshold $Q_{in}$ nor worse than the threshold $Q_{out}$. In this implementation, even when the UE does not detect any SSB of the at least one SSB configured as RLM-RS within an RLM measurement period, if the UE is not able to determine that all the SSBs of the at least one SSB configured as RLM-RS have been transmitted, then the UE may not report OOS to the higher layer.

In a possible embodiment, a UE can assume that both CSI-RS configured as RLM-RS (or used for RLM-RS) and SSBs configured as RLM-RS are transmitted in an RLM measurement window (or a DRS transmission window). The CSI-RS configured as RLM-RS can be transmitted with the same or different periodicity as SSBs configured as RLM-RS.

In a possible embodiment, a UE can receive indication of a threshold value (e.g. an Reference Signal Received Power (RSRP) threshold) to determine whether RLM-RS (SSB and/or CSI-RS) is detected, can receive DL signals potentially including the RLM-RS, and can determine whether the RLM-RS is detected based on the indicated threshold value. In one implementation, the UE can report consecutive events of not detecting any RLM-RS on configured RLM-RS resources (e.g. no detection of RLM-RS in consecutive 'N' RLM measurement windows, where 'N' can be configured by a network entity or predefined) to the network entity via a serving cell deployed in licensed spectrum.

In other embodiments, a DRS transmission window periodicity in unlicensed spectrum can be set to be small, e.g. 5 ms, so that a network entity can have more DRS transmission opportunities. A UE may not perform RLM measurements for all DRS transmission windows. That is, the UE may stop performing RLM measurements within a given RLM measurement period once the UE has completed detection and measurements of all the configured RLM-RS with required accuracy (e.g. based on requirements specified in 3GPP TS 38.133).

Figure 5:
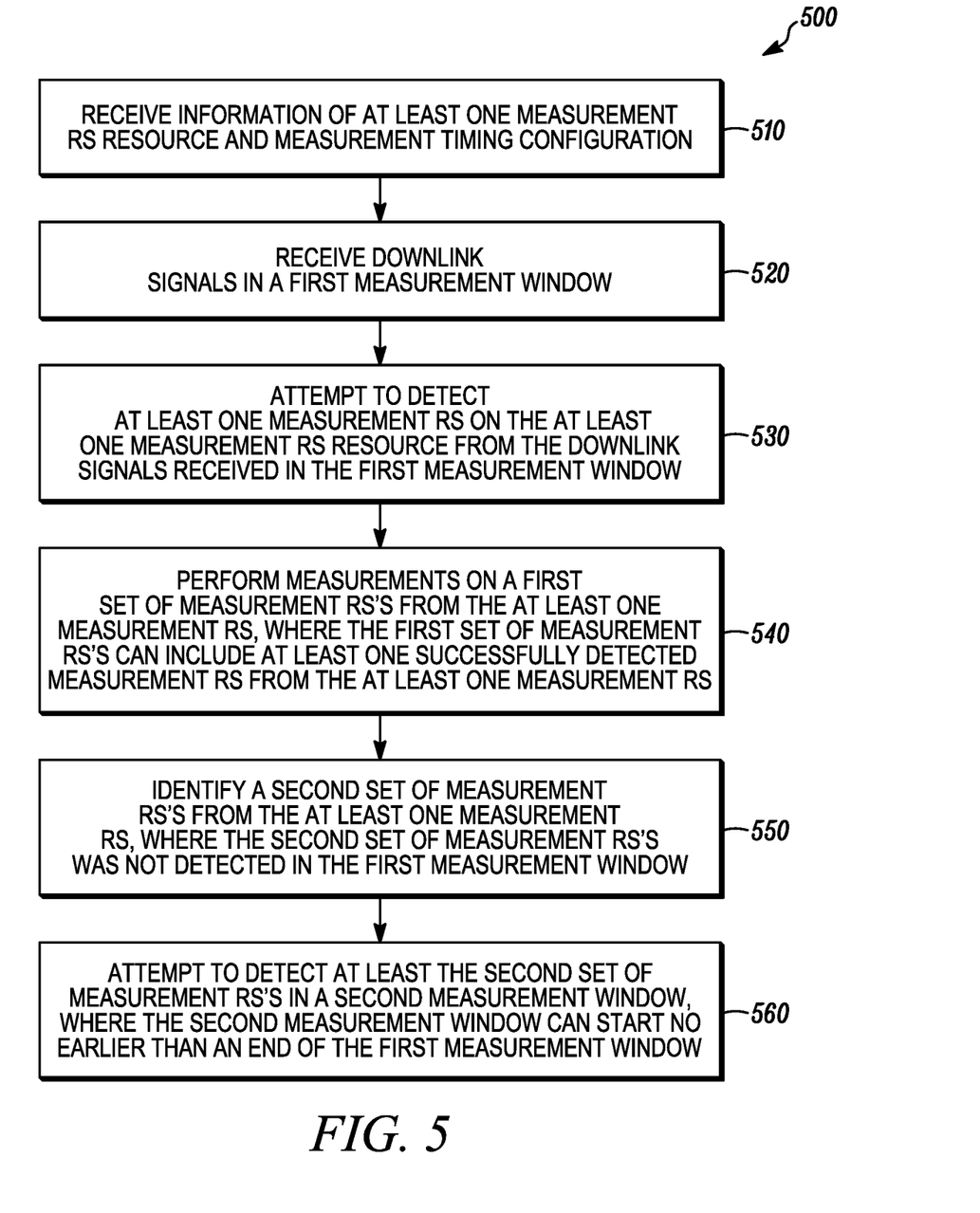
FIG. 5 is an example flowchart illustrating the operation of an apparatus according to a possible embodiment.

FIG. 5 is an example flowchart 500 illustrating the operation of a wireless communication device, such as the UE 110, according to a possible embodiment. At 510, information of at least one measurement RS resource and measurement timing configuration can be received. At 520, downlink signals can be received in a first measurement window. A measurement window can also be considered a transmission window for transmissions from a network entity.

At 530, an attempt can be made to detect at least one measurement RS on the at least one measurement RS resource from the downlink signals received in the first measurement window. At 540, measurements can be performed on a first set of measurement RSs from the at least one measurement RS. The first set of measurement RSs can include at least one successfully detected measurement RS from the at least one measurement RS.

At 550, a second set of measurement RSs can be identified from the at least one measurement RS, where the second set of measurement RSs was not detected in the first measurement window. At 560, an attempt can be made to detect at least the second set of measurement RSs in a second measurement window, where the second measurement window can start no earlier than an end of the first measurement window.

According to a possible embodiment, the at least one measurement RS can be at least one SS/PBCH block. The first measurement window can correspond to a discovery reference signal transmission window.

According to a possible embodiment, the second measurement window can be located in a time interval between an end of the first measurement window and a start of a third measurement window. The first and third measurement windows can be periodically occurring consecutive measurement windows.

According to a possible embodiment, a third set of measurement RSs can be identified from the second set of measurement RS, where the third set of measurement RSs was not detected in the second measurement window. An attempt can be made to detect at least the third set of measurement RSs in a third measurement window, where the third measurement window starts no earlier than an end of the second measurement window.

According to a possible embodiment, the information of the measurement timing configuration can include configuration information of periodically occurring measurement windows and configuration information of at least one auxiliary measurement window that can occur between periodically occurring consecutive measurement windows. According to a possible implementation, the configuration information of periodically occurring measurement windows can include a periodicity, a slot offset value, a subframe offset value, and/or a duration of periodically occurring measurement windows. According to a possible implementation, the configuration information of the at least one auxiliary measurement window can include a maximum number of auxiliary measurement windows within a period of periodically occurring measurement windows, can include slot and/or subframe offset values of the at least one auxiliary measurement window, and/or can include at least one duration corresponding to the at least one auxiliary measurement window.

According to a possible embodiment, attempting to detect at least the second set of measurement RSs in the second measurement window can include determining whether all of the at least one measurement RS are transmitted based on the at least one successfully detected measurement RS, and can include attempting to detect at least the second set of measurement RS in the second measurement window in response to determining that not all of the at least one measurement RS are transmitted.

According to a possible embodiment, the at least one measurement RS resource can be at least one RLM RS resource and the measurements can be RLM measurements. According to a possible implementation, a determination can be made as to whether a radio link quality of an undetected measurement RS of the at least one measurement RS is worse than a threshold value associated with an out-of-sync indication. According to a possible implementation, a determination can be made as to whether the undetected measurement RS has been transmitted. Determining whether a radio link quality of an undetected measurement RS of the at least one measurement RS is worse than a threshold value can include determining that the radio link quality of the undetected measurement RS of the at least one measurement RS is worse than the threshold value only if the undetected measurement RS has been transmitted.

For example, a UE can determine an undetected measurement RS or SSB has been transmitted from a decoded PBCH of a detected SSB. As a further example, if the UE does not detect all of the at least one SSB configured as RLM-RS but detects at least one SSB in the first DRS transmission window and successfully decodes PBCH from the detected at least one SSB, the UE can identify whether all of the at least one SSB configured as RLM-RS are transmitted from the decoded PBCH. Assuming that a PBCH including PBCH DMRS includes information of an SSB candidate position index for a corresponding SSB and information of a starting SSB in DRS transmission, the UE can identify one or more transmitted SSBs and occupied SSB candidate positions in the first DRS transmission window.

According to a possible embodiment, an indication of a threshold value can be received. A determination can be made as to whether a measurement RS of the at least one measurement RS is detected based on the indicated threshold value. According to a possible implementation, the threshold value can be a RSRP value.

According to a possible embodiment, the at least one measurement RS can be at least one CSI-RS.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments. Additionally, a network entity, such as a base station, transmission and reception point, or other network entity, can perform reciprocal operations of a UE. For example, the network entity can transmit signals received by the UE and can receive signals transmitted by the UE. The network entity can also process and operate on sent and received signals.

Figure 6:
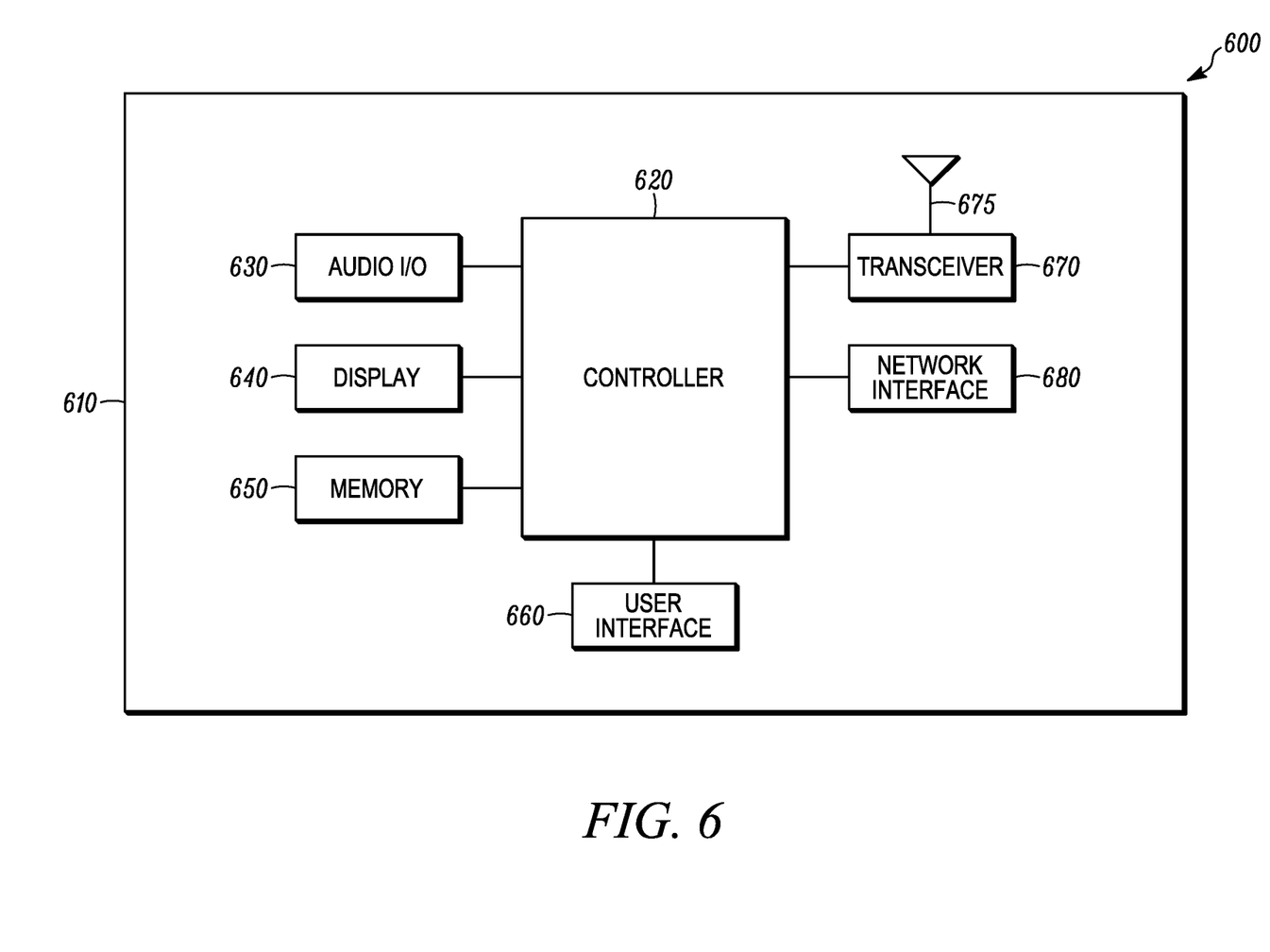
FIG. 6 is an example block diagram of an apparatus according to a possible embodiment.

FIG. 6 is an example block diagram of an apparatus 600, such as the UE 110, the network entity 120, or any other wireless communication device disclosed herein, according to a possible embodiment. The apparatus 600 can include a housing 610, a controller 620 coupled to the housing 610, audio input and output circuitry 630 coupled to the controller 620, a display 640 coupled to the controller 620, a memory 650 coupled to the controller 620, a user interface 660 coupled to the controller 620, a transceiver 670 coupled to the controller 620, at least one antenna 675 coupled to the transceiver 670, and a network interface 680 coupled to the controller 620. The apparatus 600 may not necessarily include all of the illustrated elements for different embodiments of the present disclosure. The apparatus 600 can perform the methods described in all the embodiments.

The display 640 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 670 can be one or more transceivers that can include a transmitter and/or a receiver. The audio input and output circuitry 630 can include a microphone, a speaker, a transducer, or any other audio input and output circuitry. The user interface 660 can include a keypad, a keyboard, buttons, a touch pad, a joystick, a touch screen display, another additional display, or any other device useful for providing an interface between a user and an electronic device. The network interface 680 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 650 can include a Random-Access Memory (RAM), a Read Only Memory (ROM), an optical memory, a solid-state memory, a flash memory, a removable memory, a hard drive, a cache, or any other memory that can be coupled to an apparatus.

The apparatus 600 or the controller 620 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 650, elsewhere on the apparatus 600, in cloud storage, and/or anywhere else that can store software and/or an operating system. The apparatus 600 or the controller 620 may also use hardware to implement disclosed operations. For example, the controller 620 may be any programmable processor. Furthermore, the controller 620 may perform some or all of the disclosed operations. For example, at least some operations can be performed using cloud computing and the controller 620 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating an apparatus and implementing the disclosed embodiments. Some or all of the additional elements of the apparatus 600 can also perform some or all of the operations of the disclosed embodiments.

In operation, the apparatus 600 can perform the methods and operations of the disclosed embodiments. The transceiver 670 can transmit and receive signals, including data signals and control signals that can include respective data and control information. The controller 620 can generate and process the transmitted and received signals and information.

According to a possible embodiment in operation as a UE, such as the UE 110, the transceiver 670 can receive information of at least one measurement RS resource and measurement timing configuration. The transceiver 670 can receive downlink signals in a first measurement window.

The controller 620 can attempt to detect at least one measurement RS on the at least one measurement RS resource from the downlink signals received in the first measurement window. The controller 620 can perform measurements on a first set of measurement RSs from the at least one measurement RS, where the first set of measurement RSs can include at least one successfully detected measurement RS from the at least one measurement RS. The controller 620 can identify a second set of measurement RSs from the at least one measurement RS, where the second set of measurement RSs was not detected in the first measurement window. The controller 620 can attempt to detect at least the second set of measurement RSs in a second measurement window, where the second measurement window can start no earlier than an end of the first measurement window.

According to a possible embodiment, the at least one measurement RS can be at least one SS/PBCH block. The first measurement window can correspond to a discovery reference signal transmission window.

According to a possible embodiment, the second measurement window can be located in a time interval between an end of the first measurement window and a start of a third measurement window. The first and third measurement windows can be periodically occurring consecutive measurement windows.

According to a possible embodiment, the controller 620 can identify a third set of measurement RSs from the second set of measurement RS, where the third set of measurement RSs was not detected in the second measurement window. The controller 620 can attempt to detect at least the third set of measurement RSs in a third measurement window. The third measurement window can start no earlier than an end of the second measurement window.

According to a possible embodiment, the information of the measurement timing configuration can include configuration information of periodically occurring measurement windows and can include configuration information of at least one auxiliary measurement window that can occur between periodically occurring consecutive measurement windows.

According to a possible embodiment, the controller 620 can detect at least the second set of measurement RSs in the second measurement window by determining whether all of the at least one measurement RS are transmitted based on the at least one successfully detected measurement RS, and by attempting to detect at least the second set of measurement RS in the second measurement window in response to determining that not all of the at least one measurement RS are transmitted.

According to a possible embodiment, a method at a UE can include receiving information of one or more measurement RS resources and measurement timing configuration. The method can include receiving downlink signals potentially including one or more measurement RS on the one or more measurement RS resources in a first transmission window. The method can include attempting to detect the one or more measurement RS from the received downlink signals. The method can include performing measurements on a first set of measurement RS from the one or more measurement RS, where the first set of measurement RS can include a plurality of successfully detected measurement RS from the one or more measurement RS. The method can include identifying a second set of measurement RS from the one or more measurement RS, where the UE may not detect the second set of measurement RS in the first transmission window. The method can include attempting to detect the second set of measurement RS in a first auxiliary transmission window. The first auxiliary measurement window can be located in a time interval between an end of the first measurement window and a start of a second measurement window. The first and second measurement windows can be periodically occurring two consecutive measurement windows.

The information of the measurement timing configuration can include configuration information of periodically occurring measurement windows and configuration information of one or more auxiliary measurement windows that can occur between periodically occurring two consecutive measurement windows. The configuration information of periodically occurring measurement windows can include at least one of a periodicity, a slot and/or subframe offset value, and a duration. The configuration information of the one or more auxiliary measurement windows can include at least one of a maximum number of auxiliary RLM measurement windows within a period of periodically occurring measurement windows, one or more slot and/or subframe offset values, and one or more durations corresponding to the one or more auxiliary measurement windows.

According to a possible embodiment, the method can include identifying a third set of measurement RS from the second set of measurement RS, where the UE may not detect the third set of measurement RS in the first auxiliary transmission window. The method can include attempting to detect the third set of measurement RS in a second auxiliary transmission window, where the second auxiliary transmission window can be located in a time interval between an end of the first auxiliary measurement window and a start of a second measurement window.

Attempting to detect the second set of measurement RS in the first auxiliary transmission window can include determining whether all of the one or more measurement RS are transmitted by using at least one detected measurement RS. Attempting to detect the second set of measurement RS can also include attempting to detect the second set of measurement RS in the first auxiliary transmission window in response to determining that not all of the one or more measurement RS are transmitted.

The measurement can be an RLM measurement. The method can include considering that a radio link quality of an undetected measurement RS of the one or more measurement RS is worse than the threshold $Q_{out}$. The method can include considering that a radio link quality of an undetected measurement RS of the one or more measurement RS is worse than the threshold $Q_{out}$, only if the UE identifies that the undetected SSB has been transmitted.

According to another possible embodiment in operation as a network entity, such as the network entity 120, the transceiver 670 can transmit information of at least one measurement RS resource and measurement timing configuration. The transceiver 670 can attempt to transmit at least one measurement RS on the at least one measurement RS resource in a first measurement window.

The controller 620 can identify a set of measurement RSs from the at least one measurement RS, where the set of measurement RSs was not transmitted in the first measurement window. The transceiver 670 can attempt to transmit at least the set of measurement RSs in a second measurement window, where the second measurement window can start no earlier than an end of the first measurement window.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is not admitted as prior art, is written as the inventor's own understanding of the context of some embodiments at the time of filing, and includes the inventor's own recognition of any problems with existing technologies and/or problems experienced in the inventor's own work.

We claim:

1. A method in a user equipment, the method comprising:
   receiving information of at least one measurement reference signal resource and measurement timing configuration;

receiving downlink signals in a first measurement window;

attempting to detect at least one measurement reference signal on the at least one measurement reference signal resource from the downlink signals received in the first measurement window;

performing measurements on a first set of measurement reference signals from the at least one measurement reference signal, where the first set of measurement reference signals comprises at least one successfully detected measurement reference signal from the at least one measurement reference signal;

identifying a second set of measurement reference signals from the at least one measurement reference signal, where the second set of measurement reference signals was not detected in the first measurement window; and attempting to detect at least the second set of measurement reference signals in a second measurement window, where the second measurement window starts no earlier than an end of the first measurement window.

2. The method according to claim 1, wherein the at least one measurement reference signal comprises at least one synchronization signal/physical broadcast channel block and the first measurement window corresponds to a discovery reference signal transmission window.

3. The method according to claim 1, wherein the second measurement window is located in a time interval between an end of the first measurement window and a start of a third measurement window, where the first and third measurement windows are periodically occurring consecutive measurement windows.

4. The method according to claim 1, further comprising:
identifying a third set of measurement reference signals from the second set of measurement reference signal, where the third set of measurement reference signals was not detected in the second measurement window; and attempting to detect at least the third set of measurement reference signals in a third measurement window, where the third measurement window starts no earlier than an end of the second measurement window.

5. The method according to claim 1, wherein the information of the measurement timing configuration includes configuration information of periodically occurring measurement windows and includes configuration information of at least one auxiliary measurement window that can occur between periodically occurring consecutive measurement windows, wherein the second measurement window comprises an auxiliary measurement window of the at least one auxiliary measurement window.

6. The method according to claim 5, wherein the configuration information of periodically occurring measurement windows includes at least one selected from a periodicity, a slot offset value, a subframe offset value, and a duration of periodically occurring measurement windows.

7. The method according to claim 5, wherein the configuration information of the at least one auxiliary measurement window includes at least one selected from a maximum number of auxiliary measurement windows within a period of periodically occurring measurement windows, at least one selected from slot and subframe offset values of the at least one auxiliary measurement window, and at least one duration corresponding to the at least one auxiliary measurement window.

8. The method according to claim 1, wherein attempting to detect at least the second set of measurement reference signals in the second measurement window further comprises:
determining whether all of the at least one measurement reference signal are transmitted based on the at least one successfully detected measurement reference signal; and attempting to detect at least the second set of measurement reference signal in the second measurement window in response to determining that not all of the at least one measurement reference signal are transmitted.

9. The method according to claim 1,
wherein the at least one measurement reference signal resource comprises at least one radio link monitoring reference signal resource, and
wherein the measurements are radio link monitoring measurements.

10. The method according to claim 9, further comprising determining whether a radio link quality of an undetected measurement reference signal of the at least one measurement reference signal is worse than a threshold value associated with an out-of-sync indication.

11. The method according to claim 10, further comprising determining whether the undetected measurement reference signal has been transmitted,
wherein determining whether a radio link quality of an undetected measurement reference signal of the at least one measurement reference signal is worse than a threshold value comprises determining that the radio link quality of the undetected measurement reference signal of the at least one measurement reference signal is worse than the threshold value only if the undetected measurement reference signal has been transmitted.

12. The method according to claim 1, further comprising:
receiving an indication of a threshold value; and
determining whether a measurement reference signal of the at least one measurement reference signal is detected based on the indicated threshold value.

13. A user equipment (UE) for wireless communication, the UE comprising:
at least one memory; and
at least one processor coupled with the at least one memory and configured to cause the UE to:
receive information of at least one measurement reference signal resource and measurement timing configuration;
receive downlink signals in a first measurement window;
attempt to detect at least one measurement reference signal on the at least one measurement reference signal resource from the downlink signals received in the first measurement window;
perform measurements on a first set of measurement reference signals from the at least one measurement reference signal, where the first set of measurement reference signals comprises at least one successfully detected measurement reference signal from the at least one measurement reference signal;
identify a second set of measurement reference signals from the at least one measurement reference signal, where the second set of measurement reference signals was not detected in the first measurement window; and
attempt to detect at least the second set of measurement reference signals in a second measurement window, where the second measurement window starts no earlier than an end of the first measurement window.

14. The UE according to claim 13,
wherein the at least one measurement reference signal comprises at least one synchronization signal/physical broadcast channel block, and
wherein the first measurement window corresponds to a discovery reference signal transmission window.

15. The UE according to claim 13, wherein the second measurement window is located in a time interval between an end of the first measurement window and a start of a third measurement window, where the first and third measurement windows are periodically occurring consecutive measurement windows.

16. The UE according to claim 13, wherein the processor is configured to cause the UE to:
identify a third set of measurement reference signals from the second set of measurement reference signal, where the third set of measurement reference signals was not detected in the second measurement window; and
attempt to detect at least the third set of measurement reference signals in a third measurement window, where the third measurement window starts no earlier than an end of the second measurement window.

17. The UE according to claim 13, wherein the information of the measurement timing configuration includes configuration information of periodically occurring measurement windows and includes configuration information of at least one auxiliary measurement window that can occur between periodically occurring consecutive measurement windows, wherein the second measurement window comprises an auxiliary measurement window of the at least one auxiliary measurement window.

18. The UE according to claim 13, wherein the processor is configured to cause the UE to attempt to detect at least the second set of measurement reference signals in the second measurement window by:
determining whether all of the at least one measurement reference signal are transmitted based on the at least one successfully detected measurement reference signal; and
attempting to detect at least the second set of measurement reference signal in the second measurement window in response to determining that not all of the at least one measurement reference signal are transmitted.

19. The UE according to claim 17, wherein the configuration information of the at least one auxiliary measurement window includes at least one selected from a maximum number of auxiliary measurement windows within a period of periodically occurring measurement windows, at least one selected from slot and subframe offset values of the at least one auxiliary measurement window, and at least one duration corresponding to the at least one auxiliary measurement window.

20. A processor for wireless communication, comprising:
at least one controller coupled with at least one memory and configured to cause the processor to:
receive information of at least one measurement reference signal resource and measurement timing configuration;
receive downlink signals in a first measurement window;
attempt to detect at least one measurement reference signal on the at least one measurement reference signal resource from the downlink signals received in the first measurement window;
perform measurements on a first set of measurement reference signals from the at least one measurement reference signal, where the first set of measurement reference signals comprises at least one successfully detected measurement reference signal from the at least one measurement reference signal;
identify a second set of measurement reference signals from the at least one measurement reference signal, where the second set of measurement reference signals was not detected in the first measurement window; and
attempt to detect at least the second set of measurement reference signals in a second measurement window, where the second measurement window starts no earlier than an end of the first measurement window.

* * * * *